Figure 1:
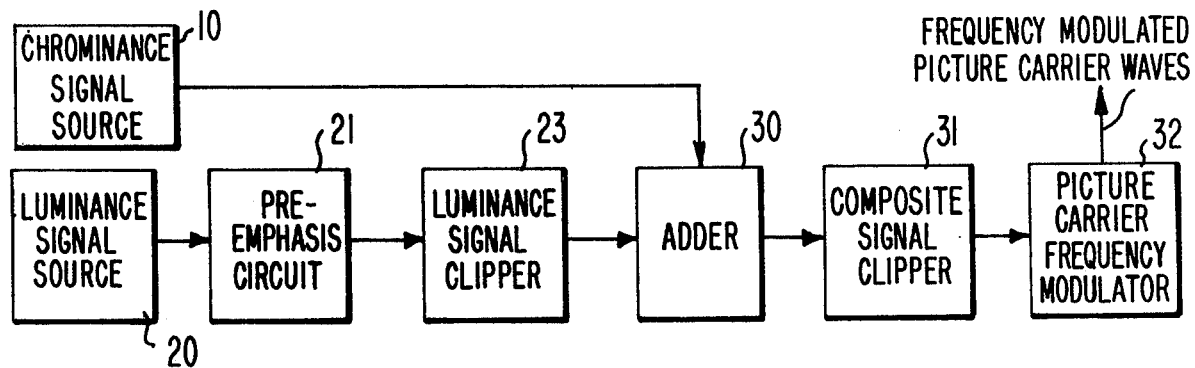

United States Patent [19]

Ross

[11] 4,096,513
[45] Jun. 20, 1978

[54] COLOR VIDEO SIGNAL PROCESSING CIRCUITS

[75] Inventor: Michael David Ross, Somerdale, N.J.

[73] Assignee: RCA Corporation, New York, N.Y.

[21] Appl. No.: 808,293

[22] Filed: Jun. 20, 1977

[30] Foreign Application Priority Data

Aug. 9, 1976 United Kingdom ............... 33119/76

[51] Int. Cl.² .......................... H04N 5/78; H04N 9/02
[52] U.S. Cl. ....................................................... 358/4
[58] Field of Search ...................... 358/4, 8, 7, 39, 38; 360/24, 33

[56] References Cited

U.S. PATENT DOCUMENTS 3,911,476  10/1975  Keizer ...................................... 358/4
3,969,756  7/1976  Palmer et al. ............................ 358/4

Primary Examiner—John C. Martin
Attorney, Agent, or Firm—Eugene M. Whitacre; William H. Meagher

[57] ABSTRACT

Luminance signals, subject to high frequency pre-emphasis, are applied to a first double-ended signal clipping circuit prior to combination with chrominance signals (in the form of modulated color subcarrier waves) to form a composite color video signal. The composite signal is fed to a second double-ended signal clipping circuit having clipping levels beyond those of the luminance signal clipper. The output of the second clipping circuit serves as the modulating signal input for a picture carrier frequency modulator.

4 Claims, 2 Drawing Figures

COLOR VIDEO SIGNAL PROCESSING CIRCUITS

The present invention relates generally to signal processing circuits useful in the translation of color picture information and particularly to novel signal processing circuits desirable for use in the formation of a modulating signal for a picture carrier frequency modulator in systems, such as video disc recording systems, that employ FM techniques in the translation of color picture information.

In certain color picture information handling systems, it is advantageous to employ FM techniques in the translation of color picture information. For example, in video disc recording systems of the type disclosed in U.S. Pat. No. 3,911,476, a recording signal is formed which includes picture carrier waves modulated in frequency in accordance with the amplitude of composite color video signals inclusive of luminance and chrominance components, with the chrominance component in the form of modulated subcarrier waves.

It is desirable in such systems to subject the luminance component to high frequency pre-emphasis prior to modulating signal formation, so that a signal-to-noise improvement may be realized when a complementary high frequency de-emphasis is imparted to the luminance component subsequent to demodulation of the FM carrier waves (e.g., in a video disc player). However, in uses such as video disc recording of the type disclosed in the aforementioned patent, there are recording process limitations which compromise the ability to form proper representations in the disc record of carrier frequencies outside a given range of frequencies. The consequences of excessively high, or excessively low, carrier frequency use in such recording can include introduction of replication difficulties, as well as development of spurious signal effects during playback. To preclude the swinging of the picture carrier frequency to such undesired extremes, it has been found to be desirable to subject the composite color video signal to the action of a (double-ended) clipping circuit prior to application to the picture carrier frequency modulator, so that the clipping levels of the clipping circuit set precise boundaries for the picture carrier deviation range within a frequency region compatible with the recording system capabilities.

However, a problem can arise from the use of the aforesaid clipping of composite color video signals formed from the combination of pre-emphasized luminance signals and modulated color subcarrier waves, particularly where, as in the system described in the aforementioned U.S. Pat. No. 3,911,476, the color subcarrier frequency is chosen to substantially correspond to an odd integral multiple of half the line frequency. Where vertical edges occur in colored areas of an image and involve certain combinations of luminance transition sharpness, magnitude and approach to luminance extremes, with particular chrominance component conditions, the result can be that (a) the sum of the pre-emphasized luminance transition and the color subcarrier cycle portion then occurring well exceeds a clipping level in the composite signal clipping circuit during a given line, whereas (b) during the succeeding line, due to the effective phase reversal of the color subcarrier, the sum of the pre-emphasized luminance transition and the color subcarrier cycle portion then occurring does not exceed a clipping level in the composite signal clipping circuit. For a vertical edge extending over a plurality of scanning lines, the consequence is a line-by-line alternation between clipping and non-clipping of the composite signal. In playback of such a recorded signal, when de-emphasis is applied to the recovered luminance signal component (after removal of the accompanying chrominance component, by comb filtering techniques such as those disclosed in U.S. Pat. No. 3,872,498), there is a line-by-line alternation between a slow luminance transition and a rapid luminance transition in representation of the vertical edge. In an image display produced in response to such a luminance signal, the vertical edge has a serrated appearance; such a serration is an annoying edge effect in image display which should desirably be avoided.

The present invention is concerned with color video signal processing apparatus for use in formation of a modulating signal for application to a carrier frequency modulator, wherein luminance signal pre-emphasis and composite signal clipping may be employed (for previously described purposes) with significantly reduced incidence of the aforementioned annoying edge serration effects (despite choice of a color subcarrier frequency with a half line frequency offset value). Pursuant to the principles of the present invention, such serration effect reduction is realized by supplementing the use of the composite signal clipper with a pre-clipping of the luminance signal component prior to combination with the chrominance signal component.

Figure 2:
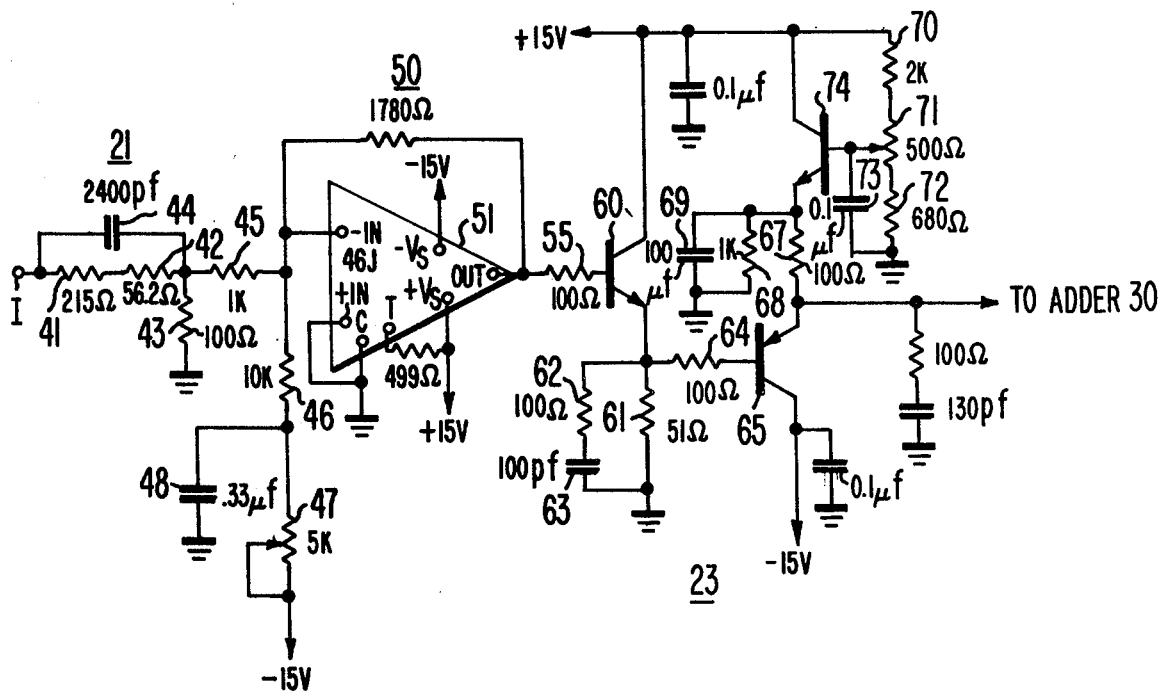

In the accompanying drawing:

FIG. 1 provides a block diagram illustration of a color picture information translating system embodying the principles of the present invention; and FIG. 2 illustrates schematically a circuit arrangement that may be employed in implementation of elements of the FIG. 1 system, pursuant to a specific embodiment of the present invention.

In FIG. 1, a chrominance signal source 10 and a luminance signal source 20 are the sources of respective correlated chrominance and luminance signal components to be combined subsequently in an adder 30 so as to form a composite color video signal. The output of adder 30 is applied via a composite signal clipper 31 to a picture carrier frequency modulator 32 for development of carrier waves modulated in frequency in accordance with the composite color video signal amplitude variations. The clipping levels in the composite signal clipper 31 (illustratively, of a double-ended clipper form) establish boundaries for the deviation range of the frequency modulated carrier waves. Where the output of the carrier frequency modulator is to be used in video disc recording signal formation, as previously suggested, the clipping level selections for the composite signal clipper 31 are such as to ensure that the picture carrier frequency does not swing to nonrecordable extremes in frequency value.

The output of the luminance signal source 20 is subjected to high frequency pre-emphasis (for previously mentioned signal-to-noise improvement reasons) in pre-emphasis circuit 21 prior to its application to the composite signal forming adder 30. Moreover, pursuant to the principles of the present invention, the pre-emphasized luminance signal is not applied directly to adder 30, but rather is supplied thereto via a luminance signal clipper 23, having reduced clipping levels set within the clipping levels of the composite signal clipper 31.

The use of pre-clipping, at reduced clipping levels, of the luminance signal component prior to chrominance component addition and subsequent composite signal clipping, can significantly reduce the occasions of incidence of noticeable edge serrations of the type previously referred to. That is, many edge signal conditions which would result in significant asymmetry of effects of the clipping action of the composite signal clipper 31 in successive lines, in the absence of use of the luminance signal clipper 23, do not produce significant asymmetry of clipping effects in successive lines when the luminance signal clipper 23 is employed.

Illustratively, the chrominance and luminance signal sources 10, 20 may comprise respective portions of suitable transcoding apparatus for transforming composite video signals from some standard format (such as NTSC, or PAL) to a so-called "buried subcarrier" format (described in the aforementioned U.S. Pat. No. 3,872,498, and particularly advantageous for video disc recording purposes). U.S. Pat. No. 3,872,498 discloses several arrangements suitable for NTSC-to-buried-subcarrier transcoding, while the copending British Application, Ser. No. 33,118/76, entitled "Transcoding Apparatus", discloses an arrangement suitable for PAL-to-buried-subcarrier transcoding.

FIG. 2 provides a schematic showing of illustrative circuitry for implementing the functions of the pre-emphasis circuit 21 and the luminance signal clipper 23 of the FIG. 1 system. The video signal output of the luminance signal source 20 (FIG. 1) appears at terminal I of FIG. 2 with a poling such that sync pulses are positive-going, and illustratively with the blanking pedestal clamped at ground potential. The signal at terminal I is applied to a frequency selective voltage divider, serving the function of pre-emphasis network 21 and formed by a trio of resistors 41, 42 and 43 connected in series between terminal I and ground, with a capacitor 44 shunted across the series combination of resistors 41 and 42. The parameters of the divider elements are chosen to effect the introduction of the desired high frequency pre-emphasis characteristic.

A resistor 45 provides a DC coupling path between the output of the pre-emphasis network 21 and the inverting input terminal (−IN) of an operational amplifier 50 (illustratively employing a device 51 of the 46J type manufactured by Analog Devices, Inc.). Input terminal (−IN) is connected to a negative DC supply terminal (−15V) via the series combination of a fixed resistor 46 and an adjustable resistor 47. The junction of resistors 46 and 47 is bypassed to ground by capacitor 48. The common terminal (c) and the non-inverting input terminal (+IN) of device 51 are grounded, and a feedback resistor 53 links the device output terminal (OUT) with input terminal (−IN). A phase-inverted version of the input luminance signal appears at the output terminal (OUT), which is coupled by resistor 55 to the base of the input transistor (NPN transistor 60) of a double-ended clipper circuit serving as the luminance signal clipper 23. A DC path between the emitter of input transistor 60 and ground is provided by resistor 61, which is shunted by the series combination of resistor 62 and capacitor 63.

A resistor 64 links the emitter of input transistor 60 to the base of the output transistor (PNP transistor 65) of the clipper circuit. A DC path between the emitter of output transistor 65 and ground is formed by the series combination of resistors 67 and 68, with resistor 68 bypassed by capacitor 69. An adjustable DC potential is supplied to the junction of resistors 67, 68 via an emitter follower transistor 74, from an adjustable voltage divider formed by resistor 70, potentiometer 71 and resistor 72, connected in series between a positive DC supply terminal (−15V.) and ground. The adjustable tap of potentiometer 71 is directly connected to the base of emitter follower transistor 74, and bypassed to ground by capacitor 73.

Adjustable resistor 47 provides a convenient facility for control of the "black" clipping level of the double ended clipper 23, while potentiometer 71 provides a convenient facility for control of the clipper's "white" clipping level. Expressed in terms of IRE units (where maximum picture white prior to pre-emphasis is +100 units, sync pedestal is 1, and sync tip is −40 units), an illustrative "black" clipping level setting results in cut off of input transistor 60 for signal excursions in the black direction beyond −66 IRE units, while an illustrative "white" clipping level setting results in cut off of output transistor 65 for signal excursions in the white direction beyond −140 IRE units.

The composite signal clipper 31 of FIG. 1 may conveniently employ double-ended clipper circuitry of the same general configuration shown for clipper 23 in FIG. 2. Illustratively, a black clipping level of −70 IRE units and a white clipping level of −144 IRE units is associated with clipper 31, when the aforementioned −66, +140 unit levels are employed in clipper 23.

What is claimed is:

1. In color picture information signal processing apparatus wherein carrier frequency waves are subject to frequency modulation in accordance with the amplitude of composite color video signals, inclusive of a luminance signal component, and a chrominance signal component in the form of modulated color subcarrier waves; modulating signal forming apparatus comprising:
   pre-emphasis circuit means for subjecting luminance signals to high frequency pre-emphasis;
   first signal clipping means, coupled to the output of said pre-emphasis circuit means, for confining the pre-emphasized luminance signal to signal excursions within a first selected range of amplitudes;
   means for combining the output of said first signal clipping means with chrominance signals to form a composite color video signal; and
   second signal clipping means, coupled to the output of said signal combining means, for confining the composite color video signal formed by said combining means to signal excursions within a second selected range of amplitudes.

2. Apparatus in accordance with claim 1 wherein the width of said second selected range of amplitudes exceeds the width of said first selected range of amplitudes, and wherein said first amplitude range is encompassed within said second amplitude range.

3. In a system for recording color picture information, said system including respective sources of correlated luminance and chrominance signals, said chrominance signals comprising modulated color subcarrier waves, and said system also including means for frequency modulating carrier frequency waves in accordance with the amplitude of a modulating signal to form a recording signal component; modulating signal forming apparatus comprising:
   a pre-emphasis circuit coupled to said luminance signal source for pre-emphasizing high frequency components of said luminance signals relative to low frequency components thereof;
   a first double-ended signal clipping circuit responsive to the output of said pre-emphasis circuit;

an adder responsive to respective outputs of said first clipping circuit and said chrominance signal source for forming a composite color video signal; and a second double-ended signal clipping circuit responsive to the output of said adder for developing said modulating signal.

4. Apparatus in accordance with claim 3 wherein said first clipping circuit exhibits a pair of clipping levels defining a range of amplitude levels within which luminance signal excursions are confined by said first clipping circuit; and wherein said second clipping circuit exhibits a pair of clipping levels lying outside said amplitude range.

* * * * *

UNITED STATES PATENT OFFICE
CERTIFICATE OF CORRECTION

PATENT NO. : 4,096,513

DATED : June 20, 1978

INVENTOR(S) : Michael David Ross

It is certified that error appears in the above-identified patent and that said Letters Patent are hereby corrected as shown below:

Column 4, line 12, that portion reading "1" should read -- 0 --; line 18, that portion reading "-140" should read -- +140 --; line 23, that portion reading "-144" should read -- +144 --.

Signed and Sealed this

Twenty-first Day of November 1978

[SEAL]

Attest:

RUTH C. MASON
Attesting Officer

DONALD W. BANNER
Commissioner of Patents and Trademarks